US012259368B2

(12) United States Patent
Patel et al.

(10) Patent No.: US 12,259,368 B2
(45) Date of Patent: Mar. 25, 2025

(54) TECHNIQUES FOR SYSTEM SUITABILITY TESTING OF INERT LIQUID CHROMATOGRAPHY SYSTEMS AND COLUMNS

(71) Applicant: Waters Technologies Corporation, Milford, MA (US)

(72) Inventors: Amit Patel, Shrewsbury, MA (US); Moon Chul Jung, Waltham, MA (US); Matthew A. Lauber, North Smithfield, RI (US); Kevin Wyndham, Upton, MA (US); Mathew H. DeLano, Needham, MA (US); Jennifer Simeone, Shrewsbury, MA (US)

(73) Assignee: Waters Technologies Corporation, Milford, MA (US)

( * ) Notice: Subject to any disclaimer, the term of this patent is extended or adjusted under 35 U.S.C. 154(b) by 839 days.

(21) Appl. No.: 17/471,393

(22) Filed: Sep. 10, 2021

(65) Prior Publication Data
US 2022/0082531 A1    Mar. 17, 2022

Related U.S. Application Data

(60) Provisional application No. 63/079,091, filed on Sep. 16, 2020, provisional application No. 63/079,160, filed on Sep. 16, 2020.

(51) Int. Cl.
*G01N 30/04* (2006.01)
*G01N 30/02* (2006.01)

(52) U.S. Cl.
CPC ....... *G01N 30/04* (2013.01); *G01N 2030/025* (2013.01); *G01N 2030/042* (2013.01)

(58) Field of Classification Search
CPC ............. G01N 30/04; G01N 2030/042; G01N 2030/045; G01N 2030/047
See application file for complete search history.

(56) References Cited

U.S. PATENT DOCUMENTS

2006/0027098 A1    2/2006    Lautamo
2019/0086371 A1    3/2019    Lauber et al.
(Continued)

OTHER PUBLICATIONS

International Search Report and Written Opinion issued in International Application No. PCT/IB2021/058257 dated Dec. 7, 2021.
(Continued)

*Primary Examiner* — Herbert K Roberts
(74) *Attorney, Agent, or Firm* — WOMBLE BOND DICKINSON (US) LLP; Deborah M. Vernon; Mark R. Deuca

(57) ABSTRACT

The present disclosure is directed to methods of characterizing a system containing a chromatographic column. The methods can include introducing a sample comprising a positive control and a negative control to the system containing a chromatographic column, wherein the positive control is a sensitive probe that interacts with the system and the negative control is substantially non-interacting with the system; after passing the sample through the chromatographic column, detecting the positive control and the negative control; and determining system suitability by comparing the amount of detected positive control to negative control. In some embodiments, determining system suitability (e.g., inertness of sample to the system) is accomplished by determining a ratio of detected positive control to negative control.

17 Claims, 5 Drawing Sheets

(56) References Cited

U.S. PATENT DOCUMENTS

2020/0215457 A1 7/2020 DeLano et al.
2020/0217827 A1 7/2020 Liu et al.

OTHER PUBLICATIONS

Saito et al. "High-Purity Fused-Silica Capillary Columns for Gas Chromatography." J. Chromatogr. 243(1982): 189-206.
Soboleva et al. "Application of a system suitability test for quality assurance and performance optimisation of a gas chromatographic system for pesiticide residue analysis." J. Chromatogr. A. 1027(2004): 55-65.
Wright et al. "New method for evaluating irreversible adsorption and stationary phase bleed in gas chromatographic capillary columns." J. Chromatogr. A. 1261(2012): 142-150.
Zenkevich et al. "Inertness Criterion for Gas-Chromatographic Systems." J. Anal. Chem. 69.12(2014): 1130-1140.

TECHNIQUES FOR SYSTEM SUITABILITY TESTING OF INERT LIQUID CHROMATOGRAPHY SYSTEMS AND COLUMNS

CROSS-REFERENCE TO RELATED APPLICATIONS

This patent application claims the priority and benefit of U.S. Provisional Application No. 63/079,091 filed on Sep. 16, 2020 and entitled "Techniques for System Suitability Testing of Inert LC Systems and Columns". This patent application also claims the priority and benefit of U.S. Provisional Application No. 63/079,160 filed on Sep. 16, 2020 and entitled "Evaluation of System Inertness". The content of both applications are incorporated herein by reference in their entirety.

FIELD OF THE TECHNOLOGY

The present disclosure relates to techniques for system suitability testing. More specifically, this technology relates to techniques for evaluating whether a system, such as an inert liquid chromatography system, is functioning properly.

BACKGROUND

Liquid chromatography (LC) is an analytical separation technique, which enables the separation of a mixture of chemical species on the basis of differential interactions between the compounds of the mixture and a stationary phase—defined as primary interactions, which are the anticipated interactions between the mixture, the designed stationary phase and the modulations from specifically chosen mobile phase/environmental conditions. These interactions are dependent on a number of controlled variables, such as mobile phase composition, temperature and flow rate. Because the analytical figures of merit of a given separation are dependent on a large number of variables, which directly impact the extent and degree of the primary chemical interactions, care is taken to operate at a consistent set point—through careful preparation of mobile phases, proper thermostatic control of equipment and use of reproducibly manufactured chromatographic columns.

SUMMARY

In general, the present technology relates to methods of characterizing a system, such as a pressurized flow system (e.g., a liquid chromatography system). In embodiments, the methods of the technology are directed to determining suitability of the system. That is, in some embodiments, the methods are directed to confirming system suitability for particular applications, such as chromatographic separation for metal sensitive analytes. Many applications of liquid chromatography technology target the measurement of chemical compounds known to interact with exposed metal surfaces. As a consequence of this interaction, many compounds are known to exhibit poor chromatography (retention, peak shape), recovery (peak area) or interact so strongly that the compounds cannot be measured altogether. Additionally, existing approaches to attenuate these interactions can have variable efficacy or changing performance over time of use. The present technology allows an analyst to be able to confirm system suitability for such applications, avoiding the allocation of resources (i.e., time, expense) on experiments destined to produce poor quality results.

In one aspect, the present technology is directed a method of characterizing a system containing a chromatographic column. The method according to this aspect includes introducing a sample comprising a positive control and a negative control to the system containing a chromatographic column, wherein the positive control is a sensitive probe that interacts with the system and the negative control is substantially non-interacting with the system. The method further includes (after passing the sample through the chromatographic column), detecting an amount of the positive control and the negative control; and the determining system suitability by comparing the detected amount positive control to the detected amount of negative control.

Embodiments of the above aspect of the technology can include one or more of the following features. In some embodiments, the determining system suitability step by comparing the amount of detected positive control to negative control comprises determining a ratio of detected positive control to negative control. In some embodiments, an inertness of the system is determined by the amount of detected positive control. In some embodiments, the determining system suitability step by comparing the amount of detected positive control to negative control indicates integrity of an inert coating deposited along a flow path of the system. In some embodiments, the positive control and the negative control are structurally similar. In certain embodiments, the positive control comprises a metal-sensitive or metal chelating molecule. In some embodiments the determining system suitability step by comparing the amount of detected positive control to negative control comprises detecting with a configuration of liquid-chromatography-optical, liquid-chromatography-mass spectrometry, or liquid-chromatography-optical-mass spectrometry, wherein optical is an UV/Vis absorbance or a florescence detector. In some embodiments, detecting the positive control and negative control comprises splitting the flow of the sample. In some embodiments, the method further includes employing more than one chromatographic approach to evaluate the system by introducing a sample with multiple chemical compounds, wherein the multiple chemical compounds comprise the negative control, the positive control, and a mixture of resolved neutrals. Employing more than one chromatographic approach to evaluate the system can be completed simultaneously. In some embodiments, a peak area and a peak height for the positive control and negative control have a standard deviation of less than 3.0%. In certain embodiments, a peak shape for the negative control and the positive control have an asymmetry at 10% of less than 3.0. The method, in some embodiments, can feature determining system suitability at a previously determined maintenance step of the system (e.g., at a previously determined replacement step of a used column or injector). In some embodiments, the maintenance step is scheduled after a previously determined number of uses or previously determined amount of time. In some embodiments, the system comprises a liquid chromatography column, an injector, and a detector. In certain embodiments, detecting the positive control and the negative control comprises detecting a value associated with the positive control (i.e., a first value) and a value associated with the negative control (i.e., a second value). The value associated with the positive control (first value) can be a value for at least one of peak area, peak height, peak width, or peak symmetry. In some embodiments, the value associated with the positive control is a peak area value and the relative standard deviation for peak area reproducibility is less than 3%. In certain embodiments, the value associated with the positive control is a peak height value and the relative standard deviation for peak height reproducibility is less than 2.5%. In some embodiments, the value associated with the positive control comprises a peak shape value and the peak shape value symmetry at 10% is less than 3.0.

In another aspect, the present technology is directed to methods of characterizing a system containing a chromatographic column. Methods of this aspect of the technology include: introducing a sample to a fluidic system including a flow path disposed in an interior of the fluidic system, the flow path comprising a surface, wherein the surface is substantially inert to at least one analyte in the sample, wherein the sample comprises a negative control and a positive control; and determining the inertness of the system by detecting a ratio of the positive control to the negative control.

Embodiments of the above aspect of the technology can include one or more of the following features. In some embodiments, the sample includes multiple chemical compounds in attrition to the positive control and negative control. At least one of the multiple compounds is a metal insensitive compound and measures performance attributes of the chromatographic column. In some embodiments the positive control and negative control are structurally similar. In certain embodiments, the flow path comprises the chromatographic column in line between a sample injector and a detector.

The above aspects and features of the present disclosure provide numerous advantages over the existing technology. For example, the present disclosure characterizes inert LC systems by evaluating proper function of the inert surfaces, particularly when analyzing compounds known to exhibit a high degree of metal interactions. This information can prevent wasted resources of time and expense as knowledge of the suitability of the system for a particular application will eliminate or greatly reduce experiments destined to give poor quality results.

BRIEF DESCRIPTION OF THE DRAWINGS

The technology will be more fully understood from the following detailed description taken in conjunction with the accompanying drawings, in which.

DETAILED DESCRIPTION

Figure 1:
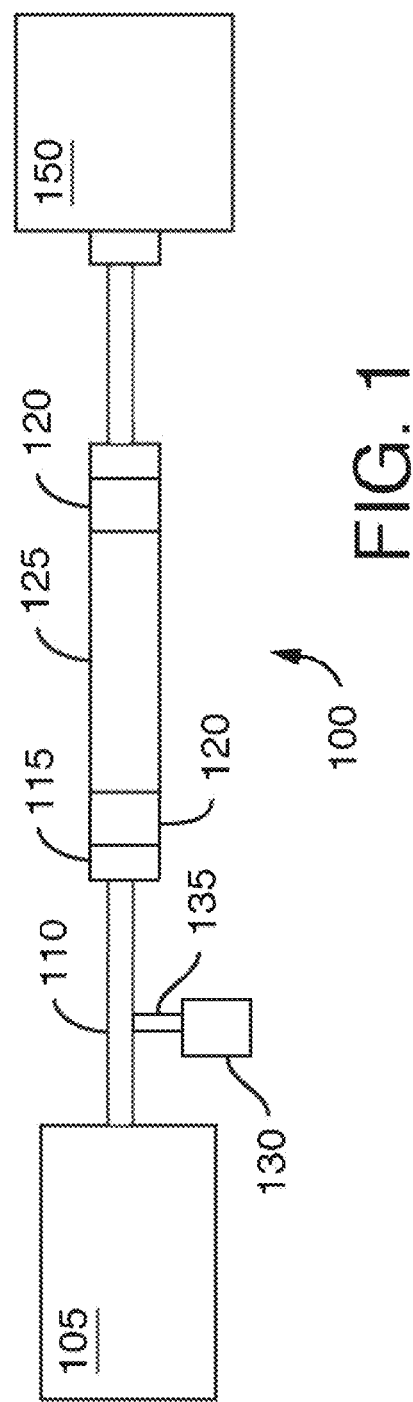
FIG. 1 is a schematic of a chromatographic system including a chromatography column and various other components, in accordance with an illustrative embodiment of the present disclosure.

In general, the present disclosure is directed to inert LC system characterization approaches for evaluating proper function of inert surfaces, particularly when analyzing compounds known to exhibit a high degree of metal interactions.

Testing can be completed to test the health of the system, including as a maintenance step. Specific times for testing the LC system may be scheduled, e.g., after a set amount of time, a set number of uses, or after a specific compound is used. Only a portion of the LC system may need to be tested at a given time, e.g., a chromatographic column. Evaluating only a portion of the system may be useful for troubleshooting the system.

What is being tested may also be varied. Evaluation tests which measure multiple performance characteristics at once are desirable. This is achieved by employing various chromatographic approaches using a cocktail of chemical compounds. For example, a single experiment may combine chromatographic approaches to simultaneously evaluate gradient delivery and exposed metal surfaces.

Figures of merit of a LC separation are dependent on a number of difficult to control variables, where "secondary interactions" are a common source of reduced performance. One example is poorly controlled metal content found in stationary phase silica particles. The uncontrolled presence of the metals in the particles results in variable secondary interactions, which can reduce the quality and reproducibility of analytical separations. Additional sources of secondary interactions include various metallic components in chromatographic columns and LC flow path components (e.g., column tube, frits, injector needle, and tubing). In order to attenuate the undesired interactions involving the surfaces of the system (e.g., the surfaces of LC flow path components), analysts have relied heavily on passivating or conditioning hardware surfaces and even making alterations to analytical methods through the use of ion pairing agents, chemical derivatization, and chelators as mobile phase additives, among others.

Another approach presented for addressing the deleterious effects of secondary interactions involves the use of LC components, which prevent contact of the analytes with metal surfaces. These technologies include PEEK or other non-metal components, PEEK-lined steel components and metal components which have been chemically modified or coated at the surface. An example of a coated surface is one using surface technology based on vapor deposited organosilica and carboxysilane compositions. A patent application published by Lauber et al. (US 20190086371A) describes this emerging technology in greater detail and is hereby incorporated by reference in its entirety. LC systems based on such technologies are generally described as inert LCs.

With progress on improving system inertness and an abundance of instrumentation options, there is a need for new techniques that can help confirm system readiness for intended applications and help determine overall system inertness. There is a paucity of tests designed for this purpose, where there is a need to detect and measure interactions that have the potential to negatively impact the analysis of metal-sensitive analytes. System suitability tests can be implemented across the pharma/biopharmaceutical industry and government labs to provide confidence in the accuracy of analytical measurements for a specific method. System readiness is one facet of a system suitability test that can confirm the proper functioning of the components comprising the system, including the solvent delivery module, sample delivery module, any required column heating/cooling modules, and finally the module(s) used for detection. In addition to ensuring proper system function, system suitability is also a confirmation of method performance as well. Such confirmations are an important aspect for the generation of reliable data.

A number of approaches can be employed individually or in combination to address the presence of secondary interactions and their impact on the quality of a given chromatographic separation. There exists a need to evaluate whether the coatings are providing an inert system for the processed samples. Consequently, inert LC system characterization approaches are necessary for evaluating proper function of the inert surfaces, particularly when analyzing compounds known to exhibit a high degree of metal interactions. Techniques for system suitability testing of inert LC systems (e.g., chromatographic system/device) are herein described. The system/device and coating to render the system/device inert will be first discussed in relation to FIG. 1.

FIG. 1 is a representative schematic of a chromatographic system/device 100 that can be used to separate analytes, such as peptide compounds, in a sample. System 100 includes several components including a fluid manager system 105 (e.g., controls mobile phase flow through the system), tubing 110 (which could also be replaced or used together with micro fabricated fluid conduits), fluid connectors 115, frits 120, a chromatography column 125, a sample injector 135 including a needle (not shown) to insert or inject the sample into the mobile phase, a vial or sample container 130 for holding the sample prior to injection, and a detector 150, such as a mass spectrometer. The chromatography column 125 can be a reversed phase column. Interior surfaces of the components of the chromatographic system/device 100 form a fluidic flow path that has wetted surfaces. Components of the fluidic flow path can have a length to diameter ratio of at least 20, at least 25, at least 30, at least 35 or at least 40. The fluidic flow path can include wetted surfaces of an electrospray needle (not shown).

At least a portion of the wetted surfaces can have a coating such as an alkylsilyl coating. The coating can tailor the hydrophobicity of the wetted surfaces. The coating can be applied by vapor deposition. As such, methods and devices of the present disclosure can include high pressure resistant materials (e.g., stainless steel) of a flow system, and the wetted surfaces of the fluidic flow path providing the appropriate hydrophobicity so deleterious interactions or undesirable chemical effects on the sample can be minimized.

In some examples, the coating of the flow path is non-binding with respect to the analyte, such as a metal-sensitive compound (e.g., a peptide). Consequently, the analyte, such as peptide compounds, does not bind to the coating of the flow path.

The coating can be provided throughout the system from the tubing or fluid conduits 110 extending from the fluid manager system 105 all the way through to the detector 150. The coatings can also be applied to portions of the components of the fluidic path. That is, one may choose to coat one or more components or portions of a component and not the entire fluidic path. For example, the internal portions of the column 125 and its frits 120 and fluid connectors 115 can be coated whereas the remainder of the flow path can be left unmodified. Further, removable/replaceable components can be coated. For example, the vial 130 containing the sample can be coated as well as frits 120.

In some examples, system 100 will need to be cleared/cleaned before evaluation begins in order to establish a baseline before beginning tests to determine suitability. Ensuring system 100 is at a baseline can help certify that there are no contaminants. It can also be used to validate a preparation process for system 100 after manufacturing of system 100 is complete. For example, after system 100 is manufactured, method 200 of FIG. 2 can be used.

The flow path of the fluidic systems can be defined at least in part by an interior surface of tubing. The flow path of the fluidic systems can also be described as defined at least in part by an interior surface of microfabricated fluid conduits. And the flow path of the fluidic systems can be described at least in part by an interior surface of a column or at least in part by passageways through a frit. The flow path of the fluidic systems is also described at least in part by an interior surface of a sample injection needle or extending from the interior surface of a sample injection needle throughout the interior surface of a column. In addition, the flow path can be described as extending from a sample container (e.g., a vial) disposed upstream of and in fluidic communication with the interior surface of a sample injection needle throughout the fluidic system to a connector/port to a detector.

In some embodiments, only the wetted surfaces of the chromatographic column and the components located upstream of the chromatographic column are coated, e.g., with an alkylsilyl coating, while wetted surfaces located downstream of the column are not coated. The coating can be applied to the wetted surfaces via vapor deposition. Similarly, the "wetted surfaces" of labware or other fluid processing devices may benefit from alkylsilyl coatings. The "wetted surfaces" of these devices not only include the fluidic flow path, but also elements that reside within the fluidic flow path. For example, frits and/or membranes within a solid phase extraction device come in contact with fluidic samples. As a result, not only the internal walls within a solid phase extraction device, but also any frits/membranes are included within the scope of "wetted surfaces." The term "wetted surfaces" refers to all surfaces within a device (e.g., chromatography column, chromatography injection system, chromatography fluid handling system, labware, solid phase extraction device, pipette tips, centrifuge tubes, beakers, dialysis chambers, etc.) that come into contact with a fluid, especially a fluid containing an analyte of interest.

In embodiments which feature an inert coating along or on wetted surfaces, at least a portion of the wetted surfaces are coated with an alkylsilyl coating. The alkylsilyl coating is inert to at least one of the analytes in the sample.

In some embodiments, the alkylsilyl coating is an organosilica coating. In certain embodiments, the alkylsilyl coating is a hybrid inorganic/organic material that forms the wetted surface or that coats the wetted surfaces.

The coating, e.g., the alkylsilyl coating, can have a contact angle with water of at least about 15°. In some embodiments, the coating can have a contact angle of less than or equal to 30°. The contact angle can be less than or equal to about 115°. In some embodiments, the contact angle of the coating is between about 15° to about 90°, in some embodiments about 15° to about 105°, and in some embodiments about 15° to about 115°. For example, the contact angle of the coating can be about 0°, 5°, 10°, 15°, 20°, 25°, 30°, 35°, 40°, 45°, 50°, 55°, 60°, 65°, 70°, 75°, 80°, 85°, 90°, 95°, 100°, 105°, 110°, or 115°.

The thickness of the coating, e.g., the alkylsilyl coating, can be at least about 100 Å. For example, the thickness can be between about 100 Å to about 1600 Å. The thickness of the coating can be about 100 Å, 200 Å, 300 Å, 400 Å, 500 Å, 600 Å, 700 Å, 800 Å, 900 Å, 1000 Å, 1100 Å, 1200 Å, 1300 Å, 1400 Å, 1500 Å or 1600 Å. The thickness of the coating (e.g., a vapor deposited alkylsilyl coating) can be detected optically by the naked eye. For example, more opaqueness and coloration is indicative of a thicker coating. From thin to thick, the color changes from yellow, to violet, to blue, to slightly greenish and then back to yellow when coated parts are observed under full-spectrum light, such as sunlight. For example, when the alkylsilyl coating is 300 Å thick, the coating can appear yellow and reflect light with a peak wavelength between 560 and 590 nm. When the alkylsilyl coating is 600 Å thick, the coating can appear violet and reflect light with a peak wavelength between 400 and 450 nm. When the alkylsilyl coating is 1000 Å thick, the coating can appear blue and reflect light with a peak wavelength between 450 and 490 nm. See, e.g., Faucheu et al., Relating Gloss Loss to Topographical Features of a PVDF Coating, Published Oct. 6, 2004; Bohlin, Erik, Surface and Porous Structure of Pigment Coatings, Interactions with flexographic ink and effects of print quality, Dissertation, Karlstad University Studies, 2013:49.

The coating can be the product of vapor deposited bis (trichlorosilyl)ethane, bis(trimethoxysilyl)ethane, bis (trichlorosilyl)octane, bis(trimethoxysilyl)octane, bis (trimethoxysilyl)hexane, or bis(trichlorosilyl)hexane. The coating comprises siloxane moieties imparted by the vapor deposited reagents.

In some aspects, at least a portion of the wetted surfaces are coated with multiple layers of the same or different alkylsilane, where the thickness of the alkylsilyl coatings correlate with the number of layering steps performed (e.g., the number of deposited layers of alkylsilyl coating on wetted surfaces).

The chromatographic device can have multiple alkylsilyl coatings. For example, a second alkylsilyl coating can be in direct contact with a first alkylsilyl coating.

In one aspect, the coating is n-decyltrichlorosilane, (3-glycidyloxypropyl)trimethoxysilane (GPTMS), (3-glycidyloxypropyl)trimethoxysilane (GPTMS) followed by hydrolysis, 2-(3,4-epoxycyclohexyl)ethyltrimethoxysilane, trimethylchlorosilane, trimethyldimethyaminosilane, methoxy-polyethyleneoxy(3)silane propyltrichlorosilane, propyltrimethoxysilane, (heptadecafluoro-1,1,2,2-tetrahydrodecyl)tris(dimethylamino)silane, (heptadecafluoro-1,1,2,2-tetrahydrodecyl)trischlorosilane, (heptadecafluoro-1,1,2,2-tetrahydrodecyl)trimethoxysilane vinyltrichlorosilane, vinyltrimethoxysilane, allyltrichlorosilane, 2-[methoxy (polyethyleneoxy)3propyl]trichlorosilane, 2-[methoxy (polyethyleneoxy)3propyl]trimethoxysilane, or 2-[methoxy (polyethyleneoxy)3propyl]tris(dimethylamino)silane.

The flow path components can be made of titanium, alloys such as MP35N® (available from Best Stainless & Alloys, Houston, TX), stainless steel, or other metals. The flow path components include but are not limited to tubing, microfabricated fluid conduits, column frits, column inlet tubing, and sample injection needles. The flow path components can be coated via vapor deposition with one or more of the disclosed alkylsilanes. In some examples, the coated components are annealed to alter their chemical or physical properties.

For flow path components made of other materials than stainless steel or other metals, the flow path components can be coated via vapor deposition with one or more of the disclosed coatings. In particular, sample vials connectable to the injection needle may be coated.

Wetted surfaces of labware or at least some portion of wetted surfaces of labware can be coated via vapor deposition with one or more of the disclosed alkylsilyl coatings. In some examples, vapor deposited coatings can minimize adsorptive losses of the sample. The vapor deposited coating can be both neutral (low in ionic properties) and hydrophilic (exhibiting a contact angle with water less than)60°. The coating can be used to mitigate issues with many different types of materials, including glass and polymeric compositions, such as polypropylene or polyethylene.

Alternatively, commercially available vapor deposition coatings can be used in the disclosed systems, devices, and methods, including but not limited to Dursan® and Dursox® (both commercially available from SilcoTek Corporation, Bellefonte, PA). The process for making is described in US Application Ser. No. 14/680,669, filed on Apr. 7, 2015, and entitled "Thermal Chemical Vapor Deposition Coated Article and Process," which claims priority to and benefit of U.S. Provisional Application No. 61/976,789 filed Apr. 8, 2014. The contents of each application are incorporated herein by reference in their entirety.

In one aspect, the alkylsilyl coatings enhance the corrosion performance of metals, e.g., as in metallic chromatography columns. Depending on the density and thickness, the coatings act as a barrier, thereby preventing water and corrosive molecules from reacting with the base metal. Increasing the hydrophobicity and density improves the corrosion performance.

In some embodiments, the alkylsilyl coating is modified with a silanizing reagent to obtain desired surface properties. The silanizing reagent can be a non-volatile zwitterion. The non-volatile zwitterion can be sulfobetaine or carboxybetaine. In some embodiments, the silanizing reagent is an acidic or basic silane. The silanizing reagent can introduce polyethylene oxide moieties.

Other components of the LC system can also include the coatings described herein, for example, the tubing, frits, and/or connectors. LC systems that include multiple coated components to minimize or eliminate the presence of metals along wetted surfaces within the fluidic flow path can be used for separating metal sensitive analytes, for example, biomolecules, proteins, glycans, peptides, oligonucleotides, pesticides, bisphosphonic acids, anionic metabolites, and zwitterions like amino acids and neurotransmitters.

The coating provides one method of how to render a system, such as an LC system and column, suitable for use. Another possible alternative to coating may be to passivate the system using liquid solvents, such as, for example, nitric acid. A system might also be rendered inert from the use of non-metallic surfaces, including polyether ether ketone, or diamond like carbon. A coating can also be a surface or composition deposited by charge vapor deposition or atomic layer deposition. After rendering the system inert, the system then needs to be tested to determine whether the system is suitable or not. Techniques for system suitability testing of systems, such as inert LC systems and columns, are described herein.

Figure 2:
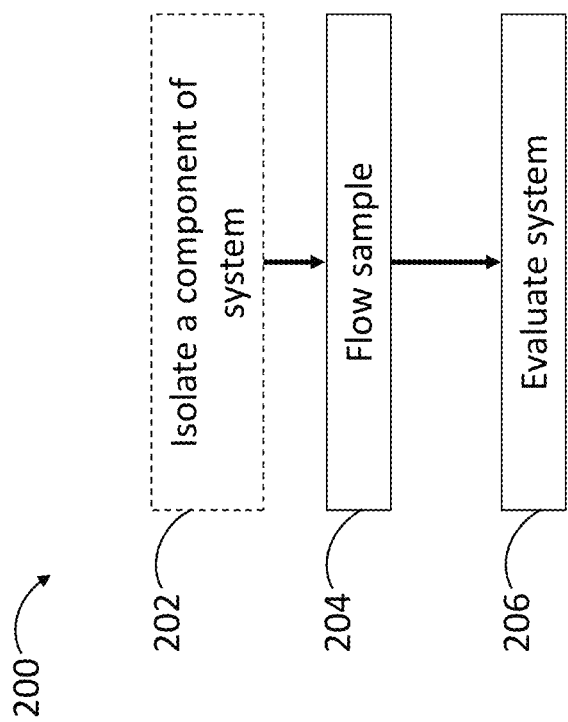
FIG. 2 is a flow chart showing a method of evaluating system suitability, in accordance with an illustrative embodiment of the present disclosure.

FIG. 2 is a flow chart showing a method 200 of evaluating system suitability, in accordance with an illustrative embodiment of the present disclosure. The method has certain steps, which are optional as indicated by the dashed outline surrounding a particular step. Method 200 can start with isolating a component of the system 202. It may be desired to only test a portion of the LC system at a given time. Only a portion of the LC system may need to be tested at a given time. When a component of the LC system (e.g., chromatographic column) is replaced, the component may be evaluated. Evaluating only a portion of the system (e.g., only a component of the system) may be useful for troubleshooting the system.

As indicated, isolating a component of the system 202 is optional. In some examples, the whole system/device will need to be evaluated for suitability. A suitability sample can be flowed 204 through a system, e.g., system/device 100. The suitability sample can contain one compound or several compounds. After the sample flows through the system, a chromatography detector can be used to evaluate the suitability sample and consequently whether the components of the flow path are inert.

During or after flowing suitability sample 204, method 200 includes evaluating the system 206. There are a number of approaches which can be employed individually or in combination to address the presence of secondary interactions and their impact on the quality of a given chromatographic separation. Inert system characterization approaches are necessary for evaluating proper function of the inert surfaces.

In some embodiments, the system suitability analysis is performed simultaneously with an injection of both a sensitive probe that interacts with the surface (positive control) and a non-interacting (negative control) probe. Peak area ratios can thus be compared to confirm system suitability. If the ratio of the positive control to the negative control is sufficiently high, the system is deemed to have good system health and to be suitable for performing analyses.

One of the techniques for assessing the suitability of inert LC systems coupled to optical or MS detectors involves the chromatographic separation and detection of an equimolar solution of Adenosine-5'-Triphosphate (ATP) and Adenosine. These two compounds share a chromophore and consequently share a wavelength of maximum UV absorbance, 259 nm, as well as exhibit identical extinction coefficients at said wavelength, E=15400 at pH 7.0. The difference between the two compounds is a series of three phosphate groups, known to interact with metals. Because ATP contains a metal interacting moiety and adenosine does not, adenosine acts as a structurally similar negative control compound. Furthermore, the substantial difference in the hydrophobicity of the positive and negative control compounds, such as ATP and Adenosine (Log P-5.5 versus-1.05), ensures their resolution in reversed phase chromatographic separations. Two compounds having Log P values differing by greater than one are desirable. Adenosine 5'-($\alpha$, $\beta$-methylene)diphosphate (AMPcP) is another pairing for adenosine (Log P-4.8 versus-1.05, respectively). In some examples, AMPcP (positive probe) is paired with caffeine (a negative probe, which does not interact with metals).

In some examples when using metal-sensitive compounds to detect exposed metal in a flow path, a reduced analyte response can be expected as some amount of the analyte binds to the metal surfaces. With subsequent injections, active binding sites can become saturated, and overall analyte response can begin to increase. This process is both reversible and in some equilibrium. To add better to control to the detection of exposed metals, it can be important to employ a flush step to remove any previously bound sample material that might mask metal surfaces and introduce undesirable variability. In some examples, a flush step can be applied of six repeat injections of a solution of 0.3% ammonia solution, prepared by a 1:100 dilution of 30% ammonium hydroxide with water.

Metal adsorption can be dependent on mobile phase conditions. High pH reduces the surface potential of metals, which can be one reason to use an ammonia solution to prepare a flow path for testing. Analyte to metal adsorption can be predominantly caused by electrostatic interactions, which also means that mobile phases with varied compositions can be applied to desorb sample and/or mitigate secondary interactions in particular methods. Accordingly, an unbuffered water/acetonitrile mobile phase for flow injection testing can be used to exacerbate metal binding and the magnitude of observed test results.

Figure 3:
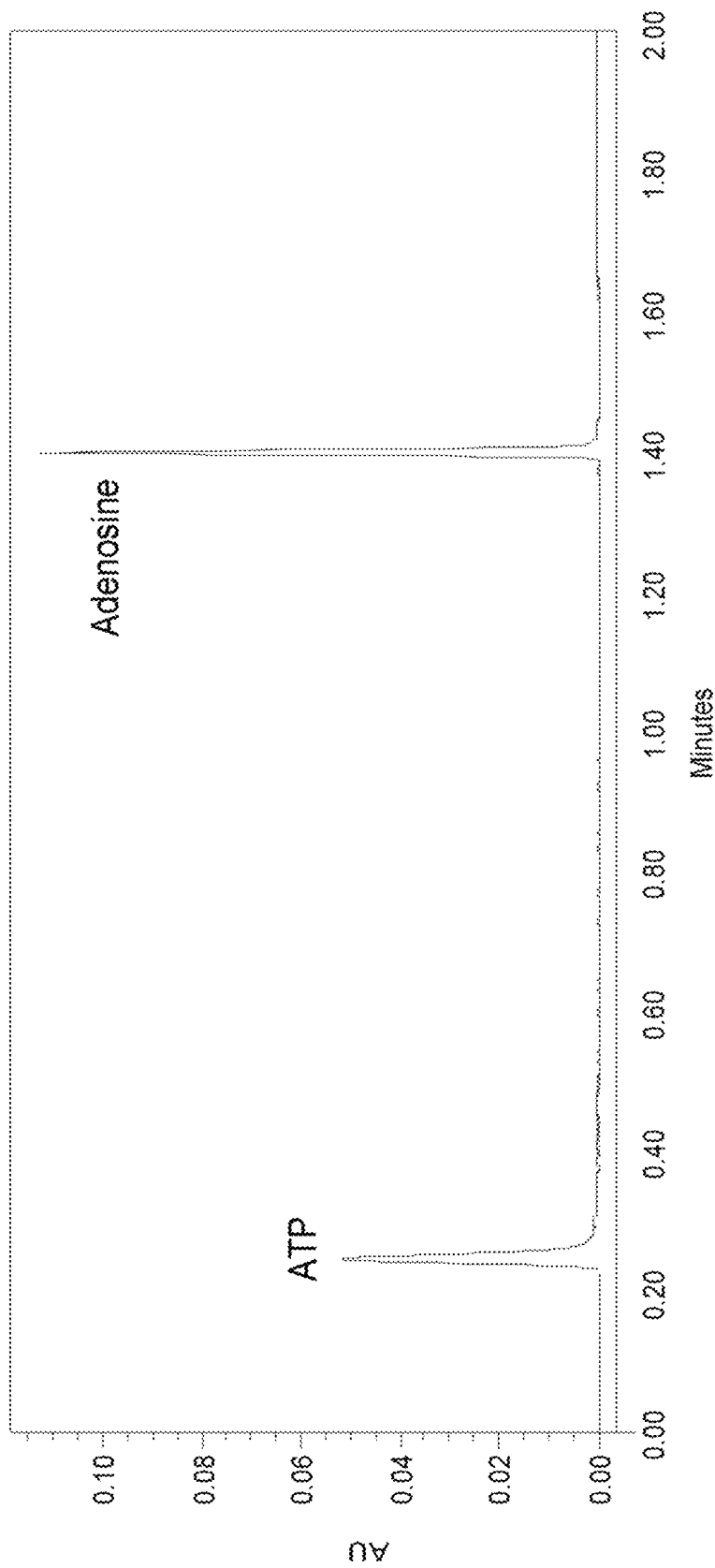
FIG. 3 is a representative chromatographic example demonstrating a chromatographic test for inert surfaces with a metal-sensitive compound and inert analog, in accordance with an illustrative embodiment of the present disclosure.

FIG. 3 is a representative chromatographic example demonstrating a chromatographic test for inert surfaces with a metal-sensitive compound and inert analog, in accordance with an illustrative embodiment of the present disclosure. Specifically, FIG. 3 displays a representative chromatographic example demonstrating the ability to readily resolve ATP and Adenosine by reversed phase chromatography. Comparison of peak area ratios, peak area reproducibility, peak shape and peak shape reproducibility allows for characterizing the liquid chromatograph and chromatographic column's surface inertness and suitability for use in applications. The comparison will use one or more compounds known to bind metals to measure surface inertness and suitability. As demonstrated in Example 1 (described below) and displayed in FIG. 3, the relative areas between ATP and Adenosine can be used to evaluate the extent of metal interaction in the system while accounting for non-secondary interaction variation (e.g. injection volume) at the same time. Furthermore, evaluation of the peak shape of the ATP compound can be used to characterize system suitability.

In some examples, a method of characterizing a system includes introducing a sample with a positive control and a negative control to the system (e.g., a suitability sample). The positive control is a sensitive probe that interacts with the system and the negative control is substantially non-interacting with the system. In some examples, a compound that is substantially non-interacting with the system can be defined as a compound that does not contain a metal interacting moiety or molecules without one or more strongly electronegative moieties, such as acidic residues with pKas lower than 5. The method can further include detecting the positive control and the negative control and determining system suitability by comparing the amount of detected positive control to negative control.

Determining system suitability by comparing the amount of detected positive control to negative control can include determining a ratio of detected positive control to negative control. If the ratio of the positive control to the negative control is sufficiently high, the system is deemed to have good system health and be suitable for performing analyses. In some examples, sufficiently high is greater than 0.5, 0.6, 0.7, 0.8 0.9 or less than 1.1, where a ratio of 1.0 indicates no loss of analyte to system flow path interactions. What is considered to be sufficiently high can vary based on the negative and positive controls that are selected. For example, positive controls that interact strongly with exposed metal (e.g., ATP or AMPcP) can have a lower end of the range of the ratio be 0.75 or 0.8.

In some examples, an analyst may adjust the system in order to target a ratio of 1.0, and an analyst can determine the lower range of acceptable values for the ratio based on the needs of the analyst/system. Determining system suitability by comparing the amount of detected positive control to negative control includes determining the inertness of the system to the positive control and/or indicates integrity of an inert coating deposited along a flow path of the system.

Determining system suitability can include testing one component of the system, e.g., a chromatographic column. Only a portion of the LC system may need to be tested at a given time. For example, evaluating only a portion of the system may be useful for troubleshooting the system.

Detecting the positive control and the negative control can use a configuration of liquid chromatography-optical, liquid chromatography-mass spectrometry, or liquid chromatography-optical-mass spectrometry, where optical represents an UV/Vis absorbance or a fluorescence detector. The flow of the suitability sample can also be split.

More than one chromatographic approach can be used to evaluate the system. The more than one chromatographic approach to evaluate the system can be completed simultaneously. For example, employing more than one chromatographic approach includes introducing a sample (i.e., a suitability sample) with multiple chemical compounds. The multiple chemical compounds include the negative control, the positive control, and a mixture of resolved neutrals. For example, the compounds can include a paraben or phenone ladder in addition to the positive and negative controls as surface probes. An example of a paraben ladder can include at least one of methylparaben, ethylparaben, propylparaben, or butylparaben. An example of a phenone ladder can include at least one or more of acetophenone, propiophenone, butylparaben, benzophenone, or valerophenone. The intentional variation of hydrophobicity helps ensure successful resolution by reversed-phase chromatography. In addition, well-characterized neutral compounds, such as 2-acetylfuran, caffeine, or acetanilide, can be used in a similar fashion. Selection is based on, at least in part, differences in hydrophobicity that can lead to a compound set which will well resolve and enable assessment of performance aspects including gradient delivery, flow rate accuracy as well as column efficiency and health. The method can include evaluating gradient delivery and exposed metal surfaces in a single injection.

Characterizing the system can be a previously determined maintenance step of the system. For example, the maintenance step can be scheduled after a previously determined number of uses or previously determined amount of time. In other embodiments, characterizing the system can occur before a long or extremely long separation or run (e.g., day or multiple day run) to ensure suitability prior to initiating a long procedure. In certain embodiments, characterizing the system can occur before separation of an expensive or precious sample. In some embodiments, characterizing the system can occur before separation of a highly metal sensitive sample or sample/application prone to known system environment suitability issues.

The above described technique for evaluating the inertness of an LC system requires the use of a chromatographic column, which is itself inert. The suitability test described above analyzed the results of a single injection of the suitability sample.

Comparison of peak area, peak shape and any changes in those metrics over repeat injections also enables an analyst to characterize the liquid chromatograph's flow path surfaces for attenuation of metal interactions. In some examples, only the positive control probe is used and a set of consecutive injections is performed with a chromatographic column in-line between the autosampler and the detector(s). A system is demonstrated to be suitable for an analysis if there is seen to be minimal change in recovery, peak area, peak height, peak width, and/or peak symmetry across the repeat injections.

When testing is done over repeat injections, it is diagnostic to look at consistency across the injections. A system that is functioning well would show consistent results across the injections for the sample detected. And these results should be reproducible. A system with exposed metal would show changes across the injections. And the number of injections used to evaluate system can vary based on the components of the system as well as the compounds of the sample. In some examples, there are at least 3 injections, 3-50 injections, 4-20 injections.

Table 1 shows the minimum specifications for the described chromatographic suitability tests utilizing ATP (positive control) and Adenosine (negative control). The minimum specifications are dependent on the instrument platform. For example, different variants of ultra-high-performance liquid chromatography (UHPLC) with different flow path parts (constructed of different materials, different lengths of tubing) as well as platforms with different coupled detectors or configurations (LC-optical, LC-MS, LC-optical-MS with or without split flow, where optical represents an UV/Vis absorbance or a fluorescence detector) can provide different results. The underlying reason relates to the amount of exposed metal introduced into the flow path from sample injection to detection. With increasing exposed metal there is a corresponding change in the resulting measurements of the test probes.

TABLE 1

Minimum specifications for system inertness

| Metric | Inert System Specifications (*RSD = Relative Standard Deviation) Chromatographic Test |
|---|---|
| Peak Area Reproducibility | <2.4% RSD* |
| Peak Height Reproducibility | <1.8% RSD* |
| Peak Shape | Asymmetry at 10% < 1.9 |
| Peak Area Ratio | ATP/Adenosine > 0.8 |

As discussed herein, the minimum specifications are dependent on the instrument platform, including the sample components such as positive control (e.g., ATP vs. AMPcP) and negative control (e.g., Adenosine or caffeine). In some examples, peak area reproducibility and peak height reproducibility for inert system specifications can have a RSD of less than about 5%, 4%, 3%, 2.5%, 2.4%, 2.3%, 2.2%, 2.1%, 2%, 1.9%, 1.8%, 1.7%, 1.6%, 1.5%, 1.4%, 1.3%, 1.2%, 1.1%, 1%, 0.9%, 0.8%, 0.7%, 0.6%, 0.5%, 0.4%, 0.3%, 0.2%, 0.1%, or any intervening number. In some examples, peak shape can have asymmetry at 10% of less than about 5, 4, 3, 2.5, 2.4, 2.3, 2.2, 2.1, 2, 1.9, 1.8, 1.7, 1.6, 1.5, 1.4, 1.3, 1.2, 1.1, 1, 0.9, 0.8, 0.7, 0.6, 0.5, 0.4, 0.3, 0.2, 0.1, or any intervening number. Depending on the sample components of the positive and negative control (e.g., ATP and Adenosine), the peak area ratio can be greater than about 5, 4, 3, 2.5, 2.4, 2.3, 2.2, 2.1, 2, 1.9, 1.8, 1.7, 1.6, 1.5, 1.4, 1.3, 1.2, 1.1, 1, 0.9, 0.8, 0.7, 0.6, 0.5, 0.4, 0.3, 0.2, 0.1, or any intervening number.

The above described evaluation approaches are well suited for LC-optical and LC-MS given that Adenosine and ATP are readily measured by UV absorbance and mass spectrometric detection. Generally, a separation or selective form of detection is needed to compare recoveries of both the positive and negative control in a single run. One form of selective detection using optical detection can be made possible by positive and negative control molecules having unique spectral properties. For instance, a positive control molecule can have a unique molar absorptivity and wavelength maximum at 280 nm, while a negative control molecule can have a UV absorbance profile with a 40 nm red shift.

Figure 4A:
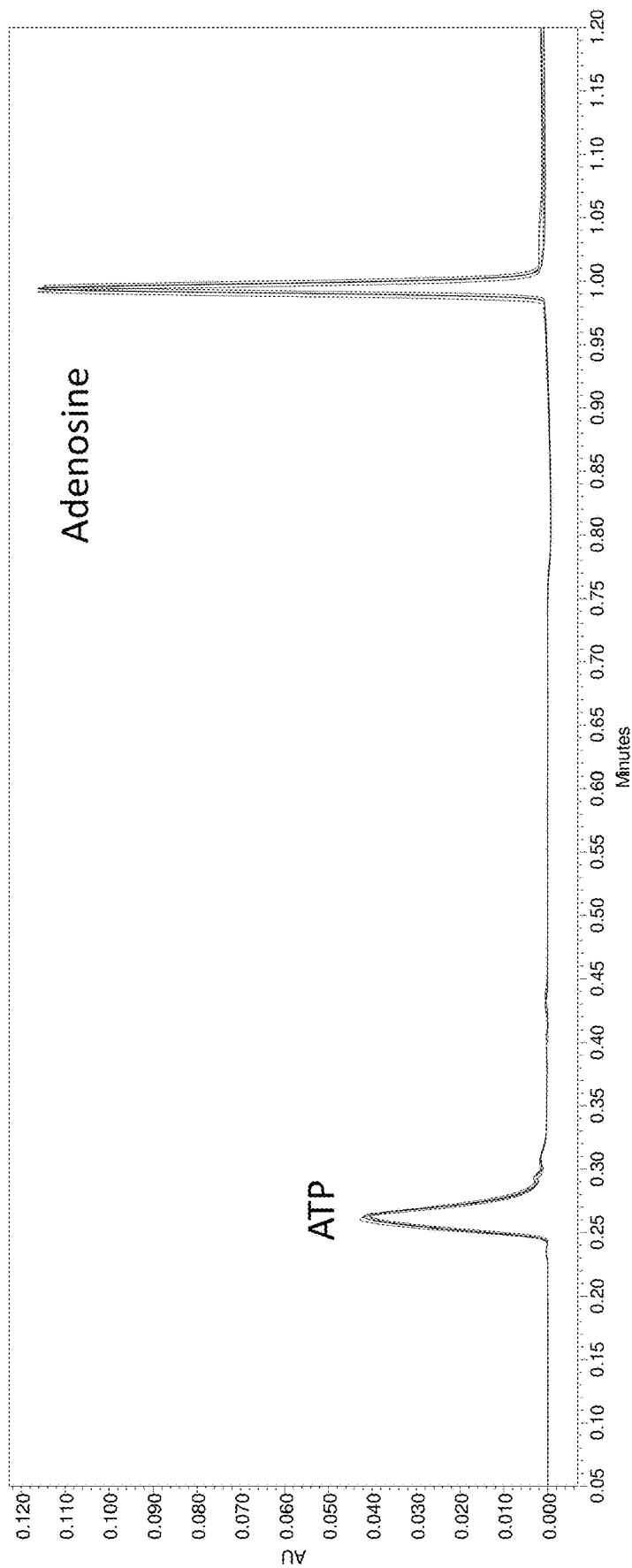
FIG. 4A displays a chromatographic test with ATP (positive control) and Adenosine (negative control) using a system that has components of the flow path coated.
Figure 4B:
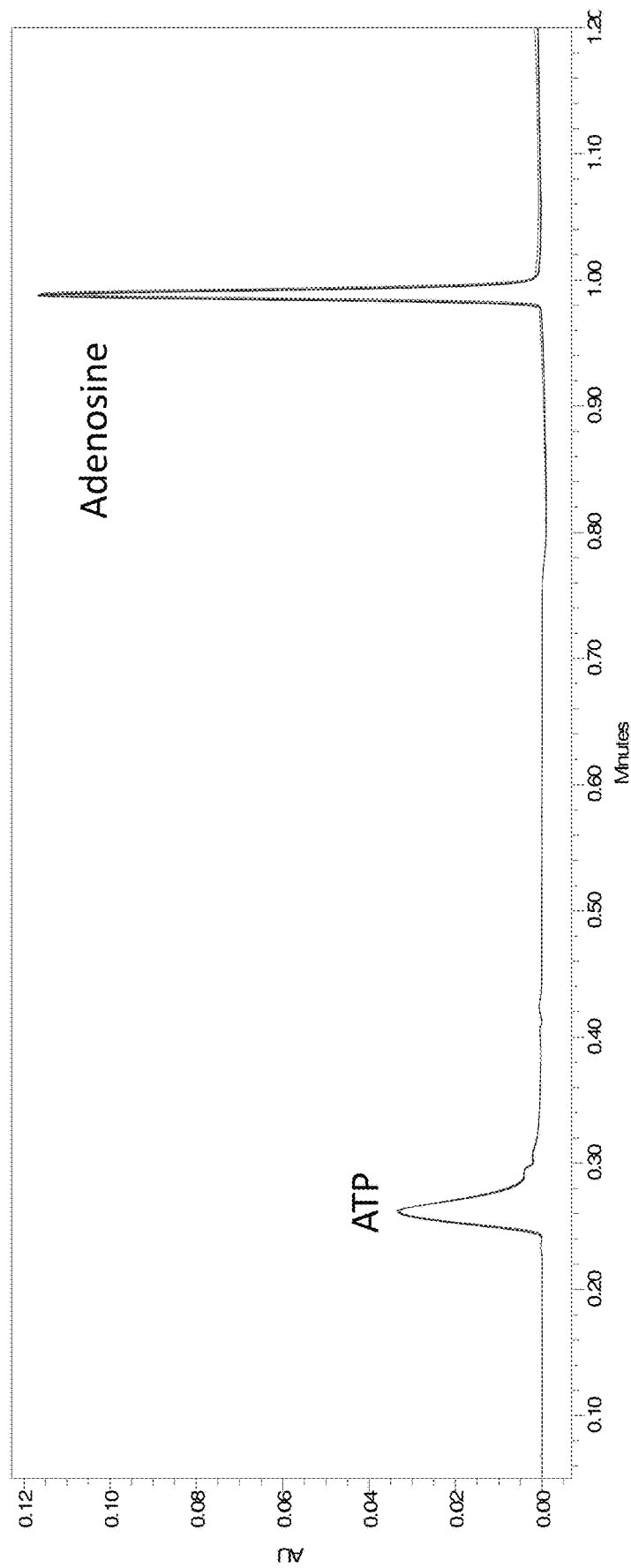
FIG. 4B displays a chromatographic test with ATP and Adenosine using a system that has components of the flow path not coated.

FIG. 4A and FIG. 4B display chromatographic tests with Adenosine-5'-Triphosphate (ATP) and Adenosine. FIG. 4A displays a chromatographic test with ATP and Adenosine using a system that has components of the flow path coated. In contrast to FIG. 4A, FIG. 4B displays a chromatographic test with ATP and Adenosine using a system that has components of the flow path not coated. Measurements for FIG. 4A and FIG. 4B include relative standard deviation (RSD) for area and height as well as reduced asymmetry at 10% and peak area ratio. Table 2 tabulates the measurements that can be used to evaluate system inertness. The peak area ratio of FIG. 4A (0.86) is closer to 1 than the peak area ratio of FIG. 4B (0.75). Thus, by comparing the peak area ratio of the coated flow path FIG. 4A versus the bio flow path of FIG. 4B, the system of FIG. 4A is evaluated to be more inert than the system of FIG. 4B.

TABLE 2

Chromatographic Test Measurements

| Metric | Chromatographic Test | |
|---|---|---|
| | Coated Flow Path | Bio Flow Path |
| Area RSD | 0.3 | 1.1 |
| Height RSD | 2.3 | 0.8 |
| Average Asymmetry at 10% | 1.32 | 1.46 |
| Peak Area Ratio | 0.86 | 0.75 |

Examples

For the reagents and standards of the examples, all reagents were acquired from Millipore-Sigma (Burlington, MA). LC-MS grade Acetonitrile was acquired from Honeywell (Muskegon, MI). Deionized water was produced using a Millipore Milli-Q system. The liquid chromatography system, including the chromatography columns, has been treated by the above described vapor deposition of organosilica to attenuate metal interactions. Example 1 employs UV detection.

EXAMPLE 1

Reversed Phase LC-UV with Detection of Adenosine-5'-Triphosphate (ATP) and Adenosine Example 1 is a technique for evaluating surface metal exposure that involves the separation and measurement of ATP/Adenosine through a chromatographic column. The Adenosine acts as a negative control, where non-metal interaction related impacts on the separation and recovery would be observed. For example, under-delivery of volume by the injector would result in reduced area for the metal-sensitive ATP as well as the Adenosine control compound.

As demonstrated in Example 1 and displayed in FIG. 3, the relative areas between ATP and Adenosine can be used to evaluate the extent of metal interaction in the system while accounting for non-secondary interaction variation (e.g. injection volume) at the same time. Furthermore, evaluation of the peak shape of the ATP compound can be used to characterize system suitability.

A test sample (e.g., a suitability sample) comprised of 20 ng/μL ATP and 9.5 ng/μL Adenosine in water is prepared from 1 mg/mL stock solutions of ATP in water and Adenosine in water. These solutions are then diluted into a single sample vial to produce the test sample. Due to the anticipated degradation of ATP to ADP by hydrolysis, it is recommended to use freshly prepared test samples. Similarly, the employed ammonium acetate mobile phases are also prepared fresh daily as the ammonium acetate buffer salt is known to be volatile.

The separation details are found in Table 3. Following the analysis of at least five injections of the test sample, the results can be evaluated for peak area, reproducibility and peak shape for ATP and Adenosine. Effective metal interaction attenuation is indicated by comparable peak areas for the two compounds, comparable and low peak area variability and comparable and low peak tailing.

TABLE 3

Separation details for Example 1

| Test Conditions | |
|---|---|
| Column | ACQUITY PREMIER HSS T3 1.8 μm 2.1 × 50 mm (p/n 186009467) |
| Sample | 20 ng/μL ATP and 9.5 ng/μL Adenosine in water |

| ACQUITY PREMIER Solvent Manager | |
|---|---|
| Solvent Line A | 10 mM ammonium acetate, pH 6.8 in 99.8:0.2 water/acetonitrile |
| Solvent Line B | 8 mM ammonium acetate in 79.8:20.2 water/acetonitrile |
| Purge Solvent | Mobile phase A |
| Wash Solvent | 50:50 Water:Acetonitrile |
| Seal Wash Solvent | 50:50 Water:Acetonitrile |
| Diluent | Water |
| Flow Rate | 0.5 mL/min |

| Gradient: | Time | % A | % B | Curve |
|---|---|---|---|---|
| | 0.0 | 95 | 5 | Initial |
| | 0.2 | 95 | 5 | 6 |
| | 0.8 | 5 | 95 | 11 |
| | 0.9 | 5 | 95 | 11 |
| | 1.0 | 95 | 5 | 11 |
| | 2.0 | 95 | 5 | 11 |

| ACQUITY PREMIER FTN | |
|---|---|
| Sample Temperature | 20° C. |
| Column Heater Set Temperature | 35° C., APH Enabled |
| Pre-Inject | 0 sec |
| Post-Inject | 6 sec |
| Needle Placement (from bottom) | 3 mm |
| | * make sure that the needle's Z-axis position is properly calibrated. |

| ACQUITY TUV/PDA Channel A | |
|---|---|
| Detector Inlet Tubing (CH-A and CM-A) | 0.0025 in. ID |
| Detector Inlet Tubing (CH-30A) | 22.5" HPS MP35N welded tube |
| Wavelength:Bandspreading | 260 nm |
| Filter | None |
| Sampling rate | 40 points per second |

Example 2

Reversed Phase LC-UV with Detection of Adenosine 5'-(α,β-methylene)diphosphate (AMPcP) and Adenosine Example 2 is a technique for evaluating surface metal exposure that involves the separation and measurement of AMPcP and Adenosine using a chromatographic column. The Adenosine acts as a negative control, where non-metal interaction related impacts on the separation and recovery would be observed. For example, under-delivery of volume by the injector would result in reduced area for the metal-sensitive AMPcP as well as the Adenosine control compound.

A test sample comprised of 17 ng/μL AMPcP and 10.7 ng/μL Adenosine in water is prepared from 1 mg/mL stock solutions of AMPcP in water and Adenosine in water. These solutions are then diluted into a single sample vial to produce the test sample. Ammonium acetate mobile phases are to be prepared fresh daily as the ammonium acetate buffer salt is known to be volatile.

The separation details are found in Table 4. Following the analysis of at least five injections of the test sample, the results can be evaluated for peak area, reproducibility and peak shape for AMPcP and Adenosine. Effective metal interaction attenuation is indicated by comparable peak areas for the two compounds, comparable and low peak area variability and comparable and low peak tailing.

TABLE 4

Separation details for Example 2

| Test Conditions | |
|---|---|
| Column | ACQUITY PREMIER HSS T3 1.8 µm 2.1 × 50 mm (p/n 186009467) |
| Sample | 17.0 ng/µL AMPcP and 10.7 ng/µL Adenosine inwater |

| ACQUITY PREMIER Solvent Manager | |
|---|---|
| Solvent Line A | 10 mM ammonium acetate, pH 6.8 in 99.8:0.2 water/acetonitrile |
| Solvent Line B | 8 mM ammonium acetate in 79.8:20.2 water/acetonitrile |
| Purge Solvent | Mobile phase A |
| Wash Solvent | 50:50 Water:Acetonitrile |
| Seal Wash Solvent | 50:50 Water:Acetonitrile |
| Diluent | Water |
| Flow Rate | 0.5 mL/min |

| Gradient: | Time | % A | % B | Curve |
|---|---|---|---|---|
| | 0.0 | 95 | 5 | Initial |
| | 0.2 | 95 | 5 | 6 |
| | 0.8 | 5 | 95 | 11 |
| | 0.9 | 5 | 95 | 11 |
| | 1.0 | 95 | 5 | 11 |
| | 2.0 | 95 | 5 | 11 |

| ACQUITY PREMIER FTN | |
|---|---|
| Sample Temperature | 20° C. |
| Column Heater Set Temperature | 35° C., APH Enabled |
| Pre-Inject | 0 sec |
| Post-Inject | 6 sec |
| Needle Placement (from bottom) | 3 mm * make sure that the needle's Z-axis position is properly calibrated. |

| ACQUITY TUV/PDA Channel A | |
|---|---|
| Detector Inlet Tubing (CH-A and CM-A) | 0.0025 in. ID |
| Detector Inlet Tubing (CH-30A) | 22.5" HPS MP35N welded tube |
| Wavelength: Bandspreading | 260 nm |
| Filter | None |
| Sampling rate | 40 points per second |

The above aspects and features of the present disclosure provide numerous advantages over the existing technology. In some embodiments, there are numerous benefits of the method of evaluating system suitability. For example, the present disclosure characterizes inert LC systems by evaluating proper function of the inert surfaces, particularly when analyzing compounds known to exhibit a high degree of metal interactions. The embodiments and features are combinable.

What is claimed is:

1. A method of characterizing a liquid chromatography system containing a chromatographic column, the method comprising:
   introducing a sample comprising a known amount of a positive control and a known amount of a negative control to a fluidic system including a flow path disposed in an interior of the fluidic system of the liquid chromatography system, the flow path comprising a surface; wherein the positive control is a sensitive probe that interacts with the surface of the fluidic flow path, and wherein the negative control is substantially non-interacting with the surface of the fluidic flow path;
   after passing the sample through the chromatographic column, detecting the amount of the positive control and the amount of the negative control that passes through the liquid chromatography system; and
   determining the liquid chromatography system suitability by comparing the amount of detected positive control to the amount of detected negative control.

2. The method of claim 1, wherein determining system suitability by comparing the amount of detected positive control to negative control comprises determining a ratio of the amount of detected positive control to the amount of detected negative control.

3. The method of claim 1, wherein determining system suitability by comparing the amount of detected positive control to the amount of detected negative control comprises determining the inertness of the system to the positive control.

4. The method of claim 1, wherein determining system suitability by comparing the amount of detected positive control to the amount of detected negative control indicates integrity of an inert coating deposited along a flow path of the system.

5. The method of claim 1, wherein the positive control comprises a metal-sensitive or metal chelating molecule.

6. The method of claim 1, wherein detecting the amount of the positive control and the amount of the negative control comprises detecting with a configuration of liquid chromatography-optical, liquid chromatography-mass spectrometry, or liquid chromatography-optical-mass spectrometry, wherein optical is an UV/Vis absorbance or a fluorescence detector.

7. The method of claim 6, wherein detecting the amount of the positive control and the amount of the negative control comprises splitting the flow of the sample.

8. The method of claim 1, further comprising employing more than one chromatographic approach to evaluate the system by introducing a sample with multiple chemical compounds, wherein the multiple chemical compounds comprise the negative control, the positive control, and a mixture of resolved neutrals.

9. The method of claim 8, wherein employing more than one chromatographic approach to evaluate the system is completed simultaneously.

10. The method of claim 1, wherein a peak area and a peak height for the positive control and the negative control have a relative standard deviation of less than 3.0%.

11. The method of claim 1, wherein a peak shape for the negative control and the positive control have an asymmetry at 10% of less than 3.0.

12. The method of claim 1, wherein determining system suitability occurs after a previously determined number of uses or previously determined amount of time.

13. The method of claim 1, wherein the system comprises a liquid chromatography column, an injector, and a detector.

14. The method of claim 1, wherein detecting the amount of the positive control and the amount of the negative control comprises detecting a value associated with the positive control and a value associated with the negative control, wherein the value associated with the positive control and the negative control comprises a value for at least one of peak area, peak height, peak width, or peak symmetry.

15. The method of claim 14, wherein the value associated with the positive control comprises a peak area value and the relative standard deviation for peak area reproducibility is less than 3%.

16. The method of claim 14, wherein the value associated with the positive control comprises a peak height value and the relative standard deviation for peak height reproducibility is less than 2.5%.

17. The method of claim 14, wherein the value associated with the positive control comprises a peak shape value and the peak shape value symmetry at 10% of less than 3.

* * * * *